United States Patent

Kovach et al.

[11] Patent Number: 6,082,286
[45] Date of Patent: Jul. 4, 2000

[54] SHIFTER WITH NOVEL SHIFT LEVER POSITION INDICATOR

[75] Inventors: Miklos A. Kovach, Holland; Jeffrey S. Jakus, Muskegon; Robert W. Roossien, Grand Haven, all of Mich.

[73] Assignee: Grand Haven Stamped Products, Grand Haven, Mich.

[21] Appl. No.: 09/123,122

[22] Filed: Jul. 27, 1998

[51] Int. Cl.⁷ ...................................................... G05G 1/28
[52] U.S. Cl. ................................ 116/28.1; 116/DIG. 20; 74/566
[58] Field of Search ........................... 116/28.1, DIG. 20, 116/306, 311, 312, 313, 321–324; 192/30 W; 74/473.21, 531, 566

[56] References Cited

U.S. PATENT DOCUMENTS

| | | |
|---|---|---|
| 3,896,759 | 7/1975 | Ogura . |
| 3,929,092 | 12/1975 | Ogura ..................................... 116/28.1 |
| 4,446,809 | 5/1984 | Dennis .................................... 116/28.1 |
| 4,566,399 | 1/1986 | Hildebrand et al. . |
| 4,964,359 | 10/1990 | Richmond .............................. 116/28.1 |
| 4,980,803 | 12/1990 | Richmond et al. ....................... 362/23 |
| 4,991,535 | 2/1991 | Kobayashi et al. .................... 116/28.1 |
| 5,159,892 | 11/1992 | Hara et al. ............................. 116/28.1 |
| 5,540,180 | 7/1996 | Kataumi et al. ....................... 116/28.1 |
| 5,626,093 | 5/1997 | Jacobs et al. .......................... 116/28.1 |

*Primary Examiner*—Andrew H. Hirshfeld
*Assistant Examiner*—R. Alexander Smith
*Attorney, Agent, or Firm*—Price, Heneveld, Cooper, Dewitt & Litton

[57] ABSTRACT

A shifter for shifting a transmission between a plurality of gear positions includes a base having a stationary member with indicia corresponding to the gear positions, a shift lever operably supported on the base for movement between the gear positions, and an improved position indicator adapted to better highlight limited portions of the indicia to indicate the selected gear position of the shift lever. The position indicator includes a support member configured to move with the shift lever that includes a window positioned to allow light to pass therethrough to visibly luminate parts of the indicia corresponding to the selected gear positions as the shift lever is moved between the plurality of gear positions. The position indicator further includes a flag spaced above and aligned with the window, and still further includes a bowed resilient strip on the support member biasing the flag into engagement with a bottom of the stationary member as the shift lever is moved between the gear positions, the bowed resilient strip providing a constant force of engagement despite dimensional variations between the support member and the indicia.

20 Claims, 3 Drawing Sheets

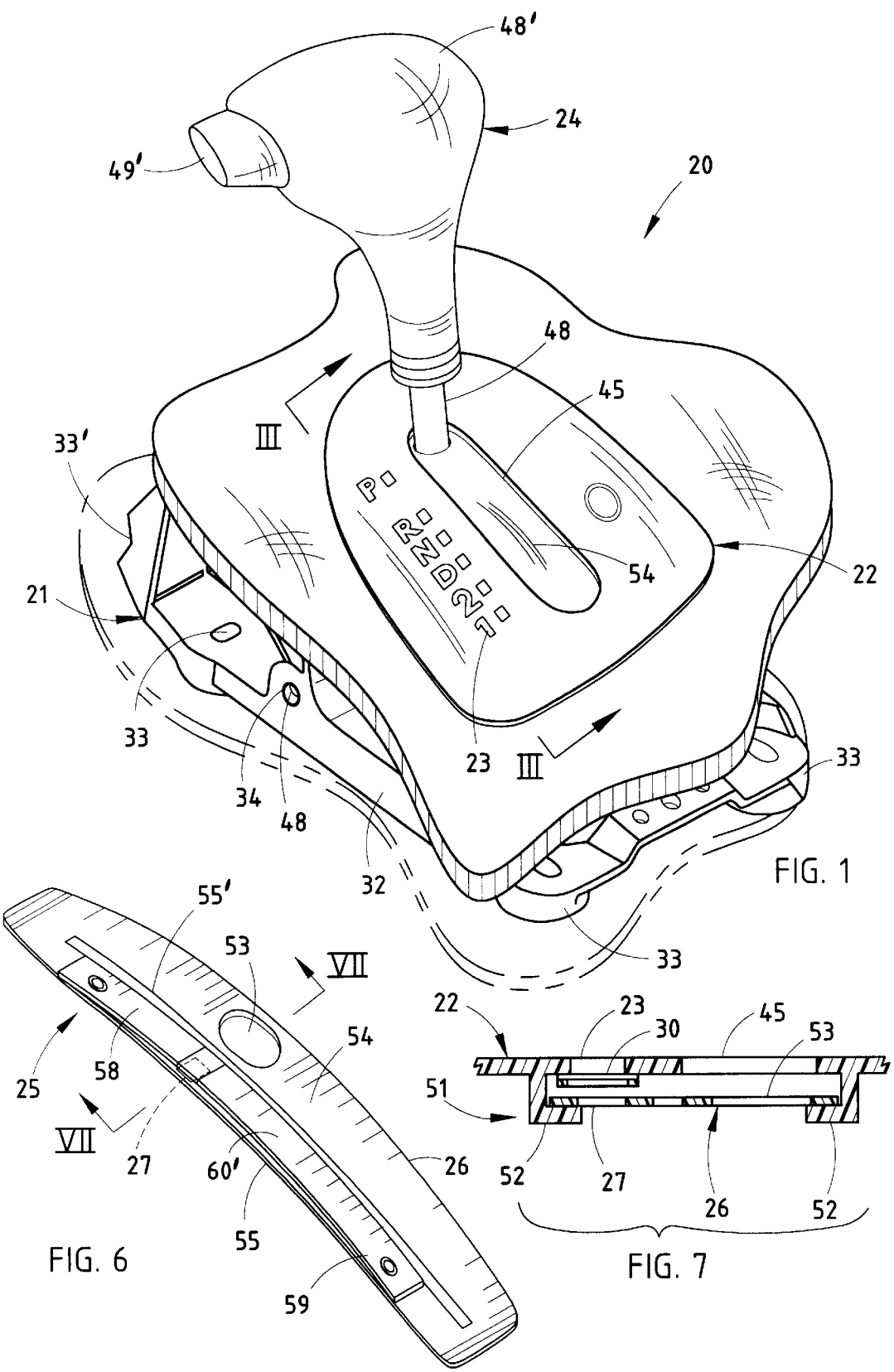

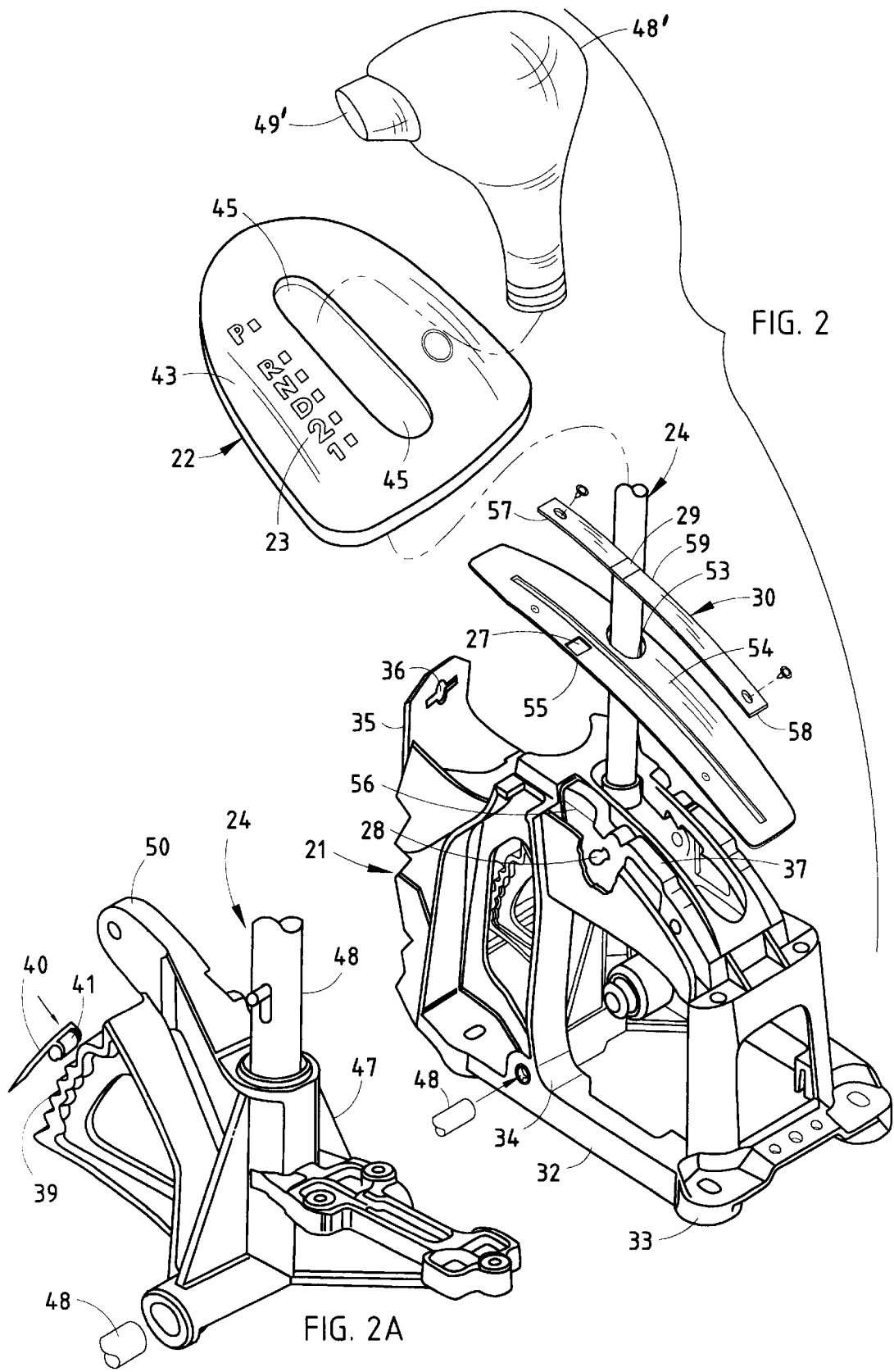

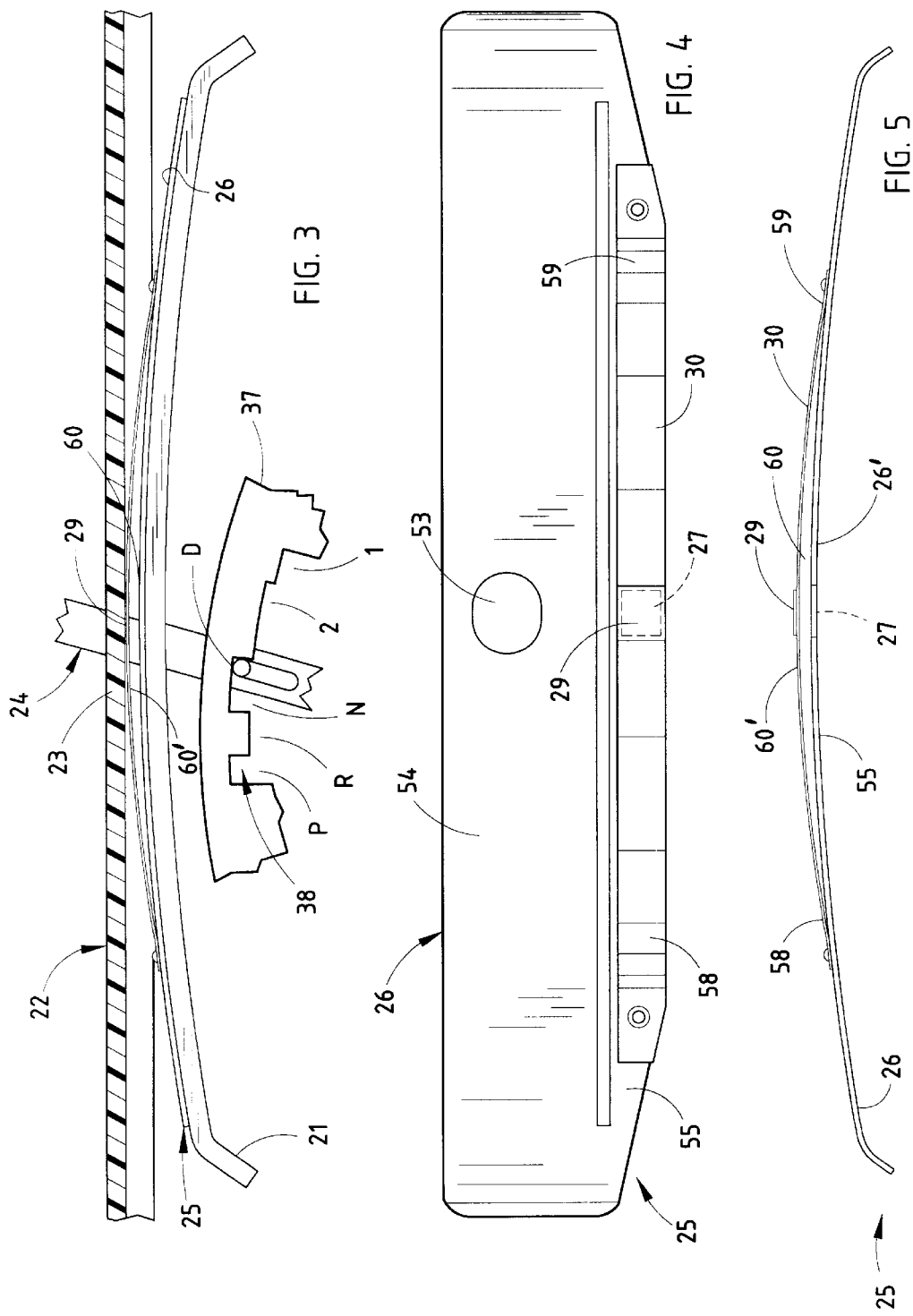

SHIFTER WITH NOVEL SHIFT LEVER POSITION INDICATOR

BACKGROUND OF THE INVENTION

The present invention concerns a shifter having a novel shift lever position indicator with a flag supported closely adjacent position indicia for optimal viewing regardless of the position of the shift lever.

Modem vehicles with automatic transmissions have transmission shifters with shift levers pivotable between different gear positions for shifting the transmissions. The shifters are provided with shift lever position indicators so that drivers know which gear position has been selected. Typically, the shift indicators include indicia with markings associated with each gear position, and a flag that moves with the shift lever to highlight the indicia to indicate a selected gear position. Often a light source shines on the flag and/or the indicia to further highlight the Iselected gear position. A problem is that dimensions and clearances vary, such that the flags may not be accurately positioned under the particular marking associated with the selected gear position. Another problem is that the flag may be spaced too far away from the indicia during all or part of the range of motion for the shift lever, such that the flag is difficult to see, even if lighted. At the same time, if the flag engages the indicia with varying degrees of force, as will occur due to dimensional variations and imperfect alignments, the flag will provide an inconsistent frictional drag as the shift lever is moved between gear positions, which results in a feel that is unacceptable to drivers. Still another important aspect concerns design criteria, where the position indicator must be low cost, mechanically uncomplicated, easily assembled, and yet very durable.

Accordingly, a shifter with shift lever position indicator is desired solving the aforementioned problems and having the aforementioned advantages.

SUMMARY OF THE INVENTION

In one aspect of the present invention, a shifter for shifting a transmission between gear positions includes a base having a stationary member with indicia thereon corresponding to the gear positions, a shift lever operably supported on the base for movement between the gear positions, and a position indicator for indicating a position of the shift lever on the base. The position indicator includes a support member configured to move with the shift lever. The support member has a window positioned to allow light to pass to visibly illuminate selected parts of the indicia corresponding to selected gear positions as the shift lever is moved between the gear positions. The position indicator further includes a flag spaced above and aligned with the window, and still further includes a resilient member on the support member biasing the flag into engagement with a bottom of the stationary member with a constant force as the shift lever is moved between the gear positions.

Another aspect of the present invention focuses on an improvement in a shifter having a base and a shift lever pivoted to the base, where the shift lever is adapted to shift a transmission between gear positions. The improvement includes a cover for covering a top of the base where the cover includes indicia with individual markings corresponding to the gear positions, a track that generally aligns with the indicia, and a band of material slidably engaging the track and associated with the shift lever so that the band of material moves along the track as the shift lever is moved. The band of material includes a support section positioned generally under the indicia and spaced therefrom with clearance. A flag is provided that is configured to make a selected part of the indicia visible when positioned thereunder, and a strip of resilient material is attached to the support section and supports the flag. The strip of resilient material is configured to bias the flag against the indicia on the cover with a constant force despite dimensional variations in the clearance.

In another aspect of the present invention, an improvement is provided for indicating a selected gear position of a shift lever, where the shift lever is movable between a plurality of gear positions, with the shift lever having a stationary member with indicia thereon corresponding to the plurality of gear positions, and further having a band of material that moves with the shift lever, and still further having a flag supported on the band of material for highlighting a portion of the indicia associated with the selected gear position of the shift lever. The improvement includes a resilient strip of material attached to the band of material, where the resilient strip has a bowed section configured to support the flag and bias the flag against the indicia with a constant force of engagement despite dimensional variations in clearance between the indicia and the band of material.

In yet another aspect of the present invention, a method includes steps of providing a shifter having a base with indicia thereon for indicating gear positions, a shift lever pivoted to the base for movement between the gear positions, a shift indicator movable with the shift lever having a flag support and a flag constructed to indicate a selected gear position on the indicia, a clearance between the flag support and the indicia being characteristically non-uniform as the shift lever is moved between gear positions, and resiliently supporting the flag on the flag support with a leaf-spring-like resilient strip of material that provides a constant biasing force that biases the flag against the indicia in all of the gear positions.

These and other aspects, objects, and advantages of the present invention will be further understood by persons skilled in the art upon studying the specification, claims, and appended drawings.

BRIEF DESCRIPTION OF THE DRAWINGS

FIG. 1 is a perspective view of a shifter including a shift lever position indicator embodying the present invention;

FIG. 2 is an exploded perspective view of the shifter including the position indicator shown in FIG. 1;

FIG. 2A is a perspective view of the shift lever shown in FIG. 2;

FIG. 3 is a cross-sectional view taken along the line III—III in FIG. 1;

FIGS. 4 and 5 are top and side views of the position indicator shown in FIG. 6;

FIG. 6 is a perspective view of the position indicator shown in FIG. 2; and

FIG. 7 is a cross-sectional view taken along the line VII—VII in FIG. 6.

DETAILED DESCRIPTION OF PREFERRED EMBODIMENT

A shifter 20 (FIG. 1) for shifting a transmission between a plurality of gear positions such as park "P," reverse "R," neutral "N," drive "D," second gear "2," and first gear "1," includes a base 21 with a stationary member such as a cover 22 having indicia 23 corresponding to the gear positions, a shift lever 24 operably supported on the base 21 for movement between the gear positions, and an improved position indicator 25 for indicating the selected gear positions of the shift lever 24. The position indicator 24 is adapted to highlight selected and limited portions of the indicia 23 to indicate the selected gear position of the shift lever 24, but without creating an unacceptable amount of drag on the shift lever 24 and without an unacceptable amount of variation in any drag that is present.

Generally described, the position indicator 25 (FIG. 6) includes a flexible but stiff band of material 26 forming a support member 26' configured to move with the shift lever 24. The band of material 26 includes a window 27 positioned to allow light from a light source 28 (FIG. 2) on the base 21 (or on the shift lever 24) to pass therethrough to visibly illuminate selected parts of the indicia 23 corresponding to the selected gear positions as the shift lever 24 is moved between the plurality of gear positions. The position indicator 25 (FIG. 5) further includes a brightly-colored flag 29 of translucent material spaced above and aligned with the window 27, and still further includes a bowed resilient strip 30 on the band of material 26 biasing the flag 29 into constant engagement with a bottom surface of the cover 22 as the shift lever 24 is moved between the gear positions. The bowed resilient strip 30 characteristically biases the flag 29 into constant contact with the cover 22 under the indicia 23, but further provides a constant and low force of engagement despite dimensional variations in the clearance between the band of material 26 (i.e., its support member) and the indicia 23.

More specifically, the illustrated base 21 (FIG. 1) includes a plate like bottom section 32 having attachment flanges 33 for attachment to a vehicle floor pan 33' or other support structure on the vehicle. Pivot mounts 34 for pivotally supporting the shift lever 24 extend upwardly from the sides of the bottom section 32 and are shaped to mateably securely receive a pivot pin 48. An apertured flange 35 extends forwardly from the bottom section 32, the apertured flange 35 including an aperture 36 configured to receive a sheath connector on a sleeve of an end of a Bowden-type transmission shift cable. A structural arch 37 extends upwardly from the bottom section 32 and includes notches 38 (FIG. 3) defining the gear positions PRND21. A feel positioner for providing a better feel to the vehicle driver includes a series of undulations 39 (FIG. 2A) formed on the shift lever 24 that correspond to the gear positions PRND21, and a leaf-spring 40 with a resiliently supported roller 41 configured to rollingly engage the undulations 39.

The cover 22 (FIG. 2) includes a stationary top member 43 that is generally flat (although it can be curved or otherwise shaped) with attachment flanges configured to securely snap attach or screw attach to the base 21. A slot 45 is formed in the cover 22 for receiving the shift lever 24. The slot 45 extends parallel the indicia 23 and permits the shift lever 24 to move between the gear positions. The indicia 23 can be any of a variety of different configurations. The illustrated indicia 23 includes letters PRND21 of transparent material located in a relatively flat area on the cover 22, such that the indicia 23 define a first path that is relatively flat (see FIG. 3).

The shift lever 24 (FIG. 2A) includes a bottom section 47 that fits between pivot mounts 34 (FIG. 2) and is supported by a pivot pin 48 on the pivot mounts 34. A post 48 extends upwardly through the slot 45 in cover 22 and supports a shift lever handle 48' for grasping by the vehicle driver. A pawl 49 on the shift lever 24 is operably connected to a button 49' on the shift lever handle 48' for engaging and disengaging the notches 38 defining the gear positions PRND21. A flange 50 (FIG. 2A) on the shift lever 24 includes a universal cable connector that is operably connected to a cable or rod and that is in turn connected to the vehicle transmission for controlling the vehicle transmission.

A track 51 (FIG. 7) is formed on a bottom of the cover 22, and includes a pair of opposing L-shaped flanges 52 for slidably receiving edges of the band of material 26. The track 51 is elongated and extends generally parallel the slot 45. The band of material 26 (FIG. 4) includes an aperture 53 for receiving the post 48, and includes additional material 54 covering the slot 45 to prevent liquid from being spilled through the slot 45 and to prevent a person from seeing through the slot. The band of material 26 further includes a section 55 (FIG. 6) separated from the material 54 by a guide slot 55' located under the indicia 23 that provides a black background so that the indicia 23 is not easily visible, except in the area of the window 27 in the band of material 26. The window 27 is characteristically large enough to allow a light beam from the light source 28 to shine through the window 27 to illuminate an individual marking of the indicia 23 for a particular selected gear position. The light source 28 (FIG. 2) is electrically connected to the vehicle power source for generating light. The light source 28 is located in a chamber 56 formed below the cover 22 so that light shines toward the window 27 during all gear positions of the shift lever 24. The flag 29 (FIGS. 4 and 5) is made of translucent and/or fluorescent material that glows when lighted by light striking its lower surface, such that it is highly visible from above even when illuminated only from a lower side that is opposite the surface being viewed.

A resilient strip 30 (FIG. 2) includes ends 57 and 58 attached by heat staking or by other means to the band of material 26 so that an intermediate section 59 of the resilient strip 30 is bowed above the band of material 26 to form a gap 60 (FIG. 5). The resilient strip 30 is long enough and the gap 60 sized such that the center section 59 will lie flat against and continuously engage a bottom of the cover 22 under the indicia 23 in the area of the markings corresponding to the selected gear positions PRND21 (FIG. 3). The resilient strip 30 simulates a leaf spring as it supports the center section 60' with a very uniform biasing force, despite variations in the gap 60. At the same time, the resilient strip 30 is not so long and the tension that it generates not so strong as to cause the intermediate strip to buckle or bow away from the cover 22, nor does it cause an unacceptable drag on the cover 22. It is noted that the flatness of cover 22 and the curvature of the strip 30 are somewhat exaggerated in FIG. 3 to better illustrate the present invention. In actual practice, the curved surfaces can be more like each other or even identical and still be within the scope of the present invention.

The flag 29 is attached to the intermediate section 60' in a location so that the flag 29 aligns with the window 27 and lies immediately under and covers the indicia 23 associated with the selected gear positions PRND21. It is noted that the flag 29 can be attached to the resilient strip 30 as a separate piece or can be integrally formed as part of the resilient strip 30, such as by painting parts of the strip 30 different colors. It is also contemplated that the resilient strip 30 itself could be molded or formed as an integral part of the band of material 26 instead of separately attached, and still be within the scope of the present invention.

In operation, the shifter 20 is assembled with the intermediate section 60' of the resilient strip 30 biased flat against a bottom of the cover 22 under the indicia 23, and with the flag 29 located under the marking of the indicia 23 associated with the selected gear positions PRND21 of the shift lever 24. As the shift lever 24 is moved between gear positions, the resilient strip 30 moves with the band of material 26, which is itself moved by engagement with the shift lever post 48. Notably, the bottom surface of the cover 22 and the top surface of the band of material 26 that define the gap 60 can vary with a greater tolerance than in prior known shifters while still maintaining adequate and/or improved visibility and without unacceptable drag on the shift lever 24 due to the constant and "forgiving" force provided by the resilient strip 30.

In the foregoing description, it will be readily appreciated by those skilled in the art that modifications may be made to the invention without departing from the concepts disclosed herein. Such modifications are to be considered as included in the following claims, unless these claims by their language expressly state otherwise.

What is claimed is:

1. A shifter for shifting a transmission between gear positions, comprising:

a base including a stationary member with indicia thereon corresponding to the gear positions;

a shift lever operably supported on the base for movement between the gear positions; and a position indicator including a support member configured to move with the shift lever, the support member including a window positioned to allow light to pass therethrough to visibly illuminate selected parts of the indicia corresponding to selected gear positions as the shift lever is moved between the gear positions, the position indicator further including a flag spaced above and aligned with the window, and still further including a resilient member on the support member biasing the flag into engagement with a bottom of the stationary member with a constant force as the shift lever is moved between the gear positions despite dimensional variations between the stationary member and the shift lever.

2. The shifter defined in claim 1 wherein the resilient member comprises a leaf-spring-shaped strip of material.

3. The shifter defined in claim 2 wherein the strip of material is flexible and resilient and is attached to the support member at one end of the strip of material.

4. The shifter defined in claim 3 wherein the strip of material is also attached to the support member at another end of the strip of material.

5. The shifter defined in claim 4 wherein the support member includes a band of material and the strip of material is bowed relative to the band of material.

6. The shifter defined in claim 1 wherein the support member includes a band of material, and the resilient member comprises a strip of material that is bowed relative to the band of material.

7. The shifter defined in claim 6 wherein the shift lever includes a post, and the band of material includes an aperture closely receiving the post so that the band of material moves with the post when the shift lever is moved between gear positions.

8. The shifter defined in claim 7 wherein the base includes a track that engages edges of the band of material to guide movement of the band of material.

9. The shifter defined in claim 8 wherein the base includes a cover incorporating the track and the stationary member with the indicia.

10. The shifter defined in claim 9 wherein the stationary member and the track are generally parallel but characteristically are not perfectly aligned, such that a clearance between the band of material and the stationary member varies as the shift lever is moved between gear positions.

11. In a shifter having a base and a shift lever pivoted to the base, where the shift lever is adapted to shift a transmission between gear positions, an improvement comprising:

a cover for covering a top of the base, the cover including indicia with individual markings corresponding to the gear positions;

a track that generally aligns with the indicia;

a band of material slidably engaging the track and associated with the shift lever so that the band of material moves along the track as the shift lever is moved, the band of material including a support section positioned generally under the indicia and spaced therefrom with a clearance;

a flag configured to make a selected part of the indicia visible when positioned thereunder; and a strip of resilient material attached to the support section and supporting the flag, the strip of resilient material biasing the flag against the indicia on the cover with a constant force despite dimensional variations in the clearance.

12. The shifter defined in claim 11 wherein the strip of resilient material is bowed as supported on the band of material.

13. The shifter defined in claim 12 wherein the band of material has a window therein that is aligned with the flag for allowing light to pass therethrough to shine on and illuminate the flag.

14. The shifter defined in claim 13 wherein the clearance between the indicia and the band of material varies as the shift lever is moved between the gear positions.

15. The shifter defined in claim 13 wherein the cover includes the track.

16. An improvement in an apparatus for indicating a selected gear position of a plurality of gear positions of a shift lever, where the shift lever is movable between the plurality of gear positions, the shift lever having a stationary member with indicia thereon corresponding to the plurality of gear positions, the shift lever including a band of material that moves with the shift lever and having a flag supported on the band of material for highlighting a portion of the indicia associated with the selected gear position of the shift lever, the improvement comprising:

a resilient strip of material attached to the band of material and having a bowed section that supports the flag and biases the flag against the indicia with a constant force of engagement despite dimensional variations in clearance between the indicia and the band of material.

17. The shifter defined in claim 16 wherein the strip of material is flexible and resilient, and wherein one end of the strip of material is attached to the band of material.

18. The shifter defined in claim 17 wherein another end of the strip of material is attached to the band of material, with an intermediate section of the strip of material being held in a bowed condition.

19. The shifter defined in claim 18 wherein the stationary member and the strip of materials are generally parallel but characteristically are not perfectly aligned, such that a clearance therebetween varies as the shift lever is moved between the plurality of gear positions.

20. A method comprising steps of:

providing a shifter having a base with indicia thereon for indicating gear positions, a shift lever pivoted to the base for movement between the gear positions, a shift indicator movable with the shift lever having a flag support and a flag constructed to indicate a selected gear position on the indicia, a clearance between the flag support and the indicia being characteristically non-uniform as the shift lever is moved between the gear positions; and resiliently supporting the flag on flag support with a leaf-spring-like resilient strip of material that provides a constant biasing force that biases the flag against the indicia for all of the gear positions.

* * * * *